US011144734B2

(12) United States Patent
Trim et al.

(10) Patent No.: US 11,144,734 B2
(45) Date of Patent: Oct. 12, 2021

(54) SELF-LEARNING NATURAL-LANGUAGE GENERATION RULES ENGINE WITH DIACHRONIC LINGUISTIC ANALYSIS

(71) Applicant: INTERNATIONAL BUSINESS MACHINES CORPORATION, Armonk, NY (US)

(72) Inventors: Craig M. Trim, Ventura, CA (US); Martin G. Keen, Cary, NC (US); Michael Bender, Rye Brook, NY (US); Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 16/438,715

(22) Filed: Jun. 12, 2019

(65) Prior Publication Data

US 2020/0394273 A1 Dec. 17, 2020

(51) Int. Cl.
*G06F 40/56* (2020.01)
*G06N 20/00* (2019.01)
*G06F 40/30* (2020.01)

(52) U.S. Cl.
CPC .............. *G06F 40/56* (2020.01); *G06F 40/30* (2020.01); *G06N 20/00* (2019.01)

(58) Field of Classification Search
None
See application file for complete search history.

(56) References Cited

U.S. PATENT DOCUMENTS

| 7,720,674 B2 | 5/2010 | Kaiser et al. |
| 9,946,711 B2 | 4/2018 | Reiter et al. |

(Continued)

FOREIGN PATENT DOCUMENTS

| JP | 2008502986 A | * | 8/2008 | .......... G06F 40/197 |
| KR | 20180049634 A | | 5/2018 | |

OTHER PUBLICATIONS

Afantenos, Stergos D.; Using Synchronic and Diachronic Relations for Summarizing Multiple Documents Describing Evolving Events; Journal of Intelligent Information Systems; Jun. 2008; 45 pages.

(Continued)

*Primary Examiner* — Richa Mishra
(74) *Attorney, Agent, or Firm* — Schmeiser, Olsen & Watts; Brian M. Restauro (57) ABSTRACT

A self-learning natural-language generation (NLG) system receives raw data from Internet-of-Things sensors or other data sources and a set of natural-language reports previously generated from the raw data by a legacy report-generation mechanism. The system divides the reports into two groups that are distinguished by differences in temporal characteristics of the reports or of the raw data from which each report is generated. The system performs a diachronic linguistic analysis that correlates values of the temporal characteristics with differences between linguistic features of each report group's natural-language text. The system creates translation rules that instruct the NLG system how to reproduce these differences and uses the rules to translate the raw data into its own natural-language reports. The system then compares the new and legacy reports and, if the new reports do not accurately reproduce the linguistic differences, analyzes more reports to improve its ability to accurately generate natural-language text.

16 Claims, 5 Drawing Sheets

(56) References Cited

U.S. PATENT DOCUMENTS

| | | | |
|---|---|---|---|
| 2011/0153601 A1* | 6/2011 | Nakazawa | G06F 16/3347 |
| | | | 707/723 |
| 2015/0019553 A1 | 1/2015 | Shaashua et al. | |
| 2018/0218285 A1* | 8/2018 | Oliner | G06N 20/00 |
| 2020/0050675 A1* | 2/2020 | Sripada | G06F 16/3328 |
| 2020/0364619 A1* | 11/2020 | Kazemi | G06F 16/2477 |

OTHER PUBLICATIONS

Barranco, Robert Camacho et al.; Tracking the Evolution of Words with Time-reflective Text Representations; 2018 IEEE International Conference on Big Data; Dec. 10-13, 2018; 12 pages.
Su, Shang-Yu; Investigating Linguistic Pattern Ordering in Hierarchical Natural Language Generation; 2018 IEEE Spoken Language Technology Workshop; Dec. 2018; pp. 779-786.

* cited by examiner

SELF-LEARNING NATURAL-LANGUAGE GENERATION RULES ENGINE WITH DIACHRONIC LINGUISTIC ANALYSIS

BACKGROUND

The present invention relates in general to cognitive technologies and in particular to natural-language generation (NLG).

Natural-language generation (NLG) is a sub-field of natural language processing (NLP) that generates natural-language representations of machine-generated data. For example NLG technology can automatically translate a table of raw weather-forecast data that includes temperature ranges, wind velocities and directions, and chances of precipitation, into a natural-language weather forecast of the form "Tomorrow's high will be near 70 degrees, with light winds from the south and a 60% chance of rain."

NLG applications generally perform these functions by incorporating cognitive analytics or other artificially intelligent technologies in accordance with stored rule sets that are interpreted by a rules engine.

These rules can be specific to a particular application and to the type of input data that the application receives. The stored rules can be manually updated to accommodate changes in the application's implementation goals or operating environment, such as a change in the type of input received by the application, a change in a characteristic of the users who read the application's output, or any other revision required in order to improve the accuracy of the application's output.

Linguistic analysis analyzes the form and meaning of language, including grammatical characteristics like syntax, semantics, and morphology, as used in a particular context or by a particular community. Diachronic linguistic analysis compares linguistic features of language that is generated at different times. For example, a diachronic linguistic analysis may reveal differences between the ways that an Old English text and a Middle English text describe a similar event.

An Internet of Things (IoT) device is an autonomous networked device, such as an environmental sensor, designed to perform a particular narrowly defined operation. Examples of IoT devices are networked thermostats, blood-pressure sensors, and smoke detectors. IoT devices generally transmit streams of sensor data through the Internet, or through a communications network like a 5G telecommunications network, to a remote centralized application.

SUMMARY

Embodiments of the present invention comprise systems, methods, and computer program products for self-learning natural-language generation (NLG) using diachronic linguistic analysis. An NLG system receives raw data from Internet-of-Things sensors or other data sources and a set of natural-language reports previously generated from the raw data by a legacy report-generation mechanism. The system divides the reports into two groups that are distinguished by differences in one or more temporal characteristics of the reports or of the raw data from which each report is generated. The system performs a diachronic linguistic analysis that correlates values of the temporal characteristics with differences between linguistic features of each group's natural-language text. The system creates translation rules that instruct the NLG system how to reproduce these differences when translating raw data into natural language, as a function of the one or more temporal characteristics, and then stores the created rules in a rulebase optionally managed by the NLG system's rule engine. The system then uses the rules to generate its own natural-language reports. The system then compares the new reports to the legacy reports and, if the new reports do not accurately reproduce the linguistic differences, repeats the above procedures by linguistically analyzing more reports in order to continue to learn how to use temporal characteristics in order to more accurately generate natural-language text.

DETAILED DESCRIPTION

Natural-language generation (NLG) technology can translate sensor measurements, statistics, tables of archival records, and other types of raw data into human-readable natural-language text. This requires a nuanced understanding of human language sufficient to produce output that realistically emulates prose produced by human beings.

Embodiments of the present invention may use cognitive analytics or other artificially intelligent technologies to generate such output. These technologies generally determine how to translate a particular set of raw data by following a "rulebase" of context-sensitive translation rules. Self-learning embodiments comprise a rules-engine component that continuously updates the rulebase through machine-learning methods.

These machine-learning methods may include comparing previously generated reports to the raw data from which each report was generated. These comparisons allow a rules engine to manage rules identifying linguistic choices that were used to generate specific report language.

Machine-learning technology may also be used to train a self-learning embodiment by providing feedback about how successfully a previous sample of the system's output emulates human language. When the feedback identifies a translation flaw, the system may refine rulebase rules to prevent the flaw from recurring. In these ways, the self-learning NLG system learns over time how to produce increasingly authentic natural-language output.

Embodiments improve known NLG systems by using diachronic linguistic analysis to infer translation rules that account for temporal characteristics of the raw data from which natural language is generated. This feature is a significant improvement because such temporal considerations can greatly affect the linguistic style of natural-language prose.

A temporal translation rule may be inferred from any sort of temporal correlations between a linguistic feature of a natural-language sample and either that sample's creation time or the creation time of data from which the sample was generated.

For example, "long-term" or "far-term" weather forecasts that predict the arrival of a tropical storm in one or two weeks have different linguistic characteristics than does a "short-term" or "near-term" forecast generated from data captured just hours before the storm strikes. The longer-term reports based likely comprise broader, less-precise language, but a forecast of an imminent weather event contains language that more precisely states wind velocities, surf heights, and other quantitative parameters and that makes definitive predictions about storm intensity, speed, path, and arrival time.

In other contexts, the diachronic linguistic analysis can analyze other types of temporal differentiators. For example, an analysis might determine that, because the relative importance of workplace-safety standards has grown over the last ten years, the language of a recently published employee handbook is more likely to incorporate descriptions of best practices and phrases like "take care when performing this action" than do similar handbooks written more than ten years ago.

Similarly, linguistic characteristics of a 1979 sports-car review written shortly before the car began shipping are likely to differ from those of a current article that reviews the same model as a "classic car" within the context of modern automotive technology. The earlier article is more likely to comprise speculative language, future-tense verbs, and predictive or conclusory statements, while the more recent review would contain more past-tense verbs, quantitative performance measurements, definitive judgments, and references to modern computerized car tech.

Embodiments generate and automatically update temporal rules through machine-learning methods that use diachronic linguistic analysis to associate one or more temporal characteristics of the raw data from which previously generated natural language was generated (or a temporal characteristic of the of the generated language itself) with certain linguistic features of the generated language. The rules inferred from these associations allow the NLG system to intelligently incorporate the certain linguistic characteristics into language generated from new data associated with a similar temporal characteristic.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
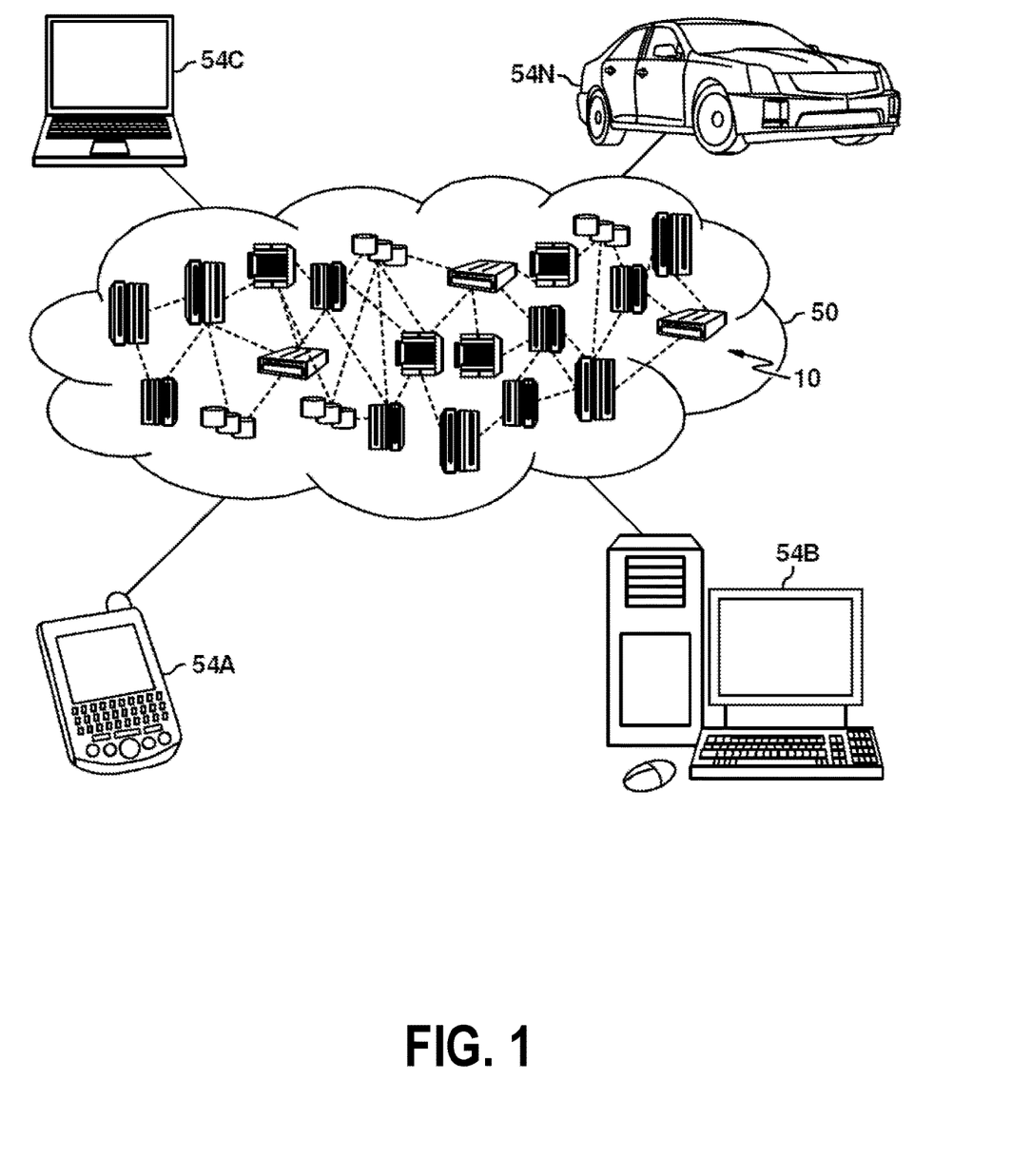
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
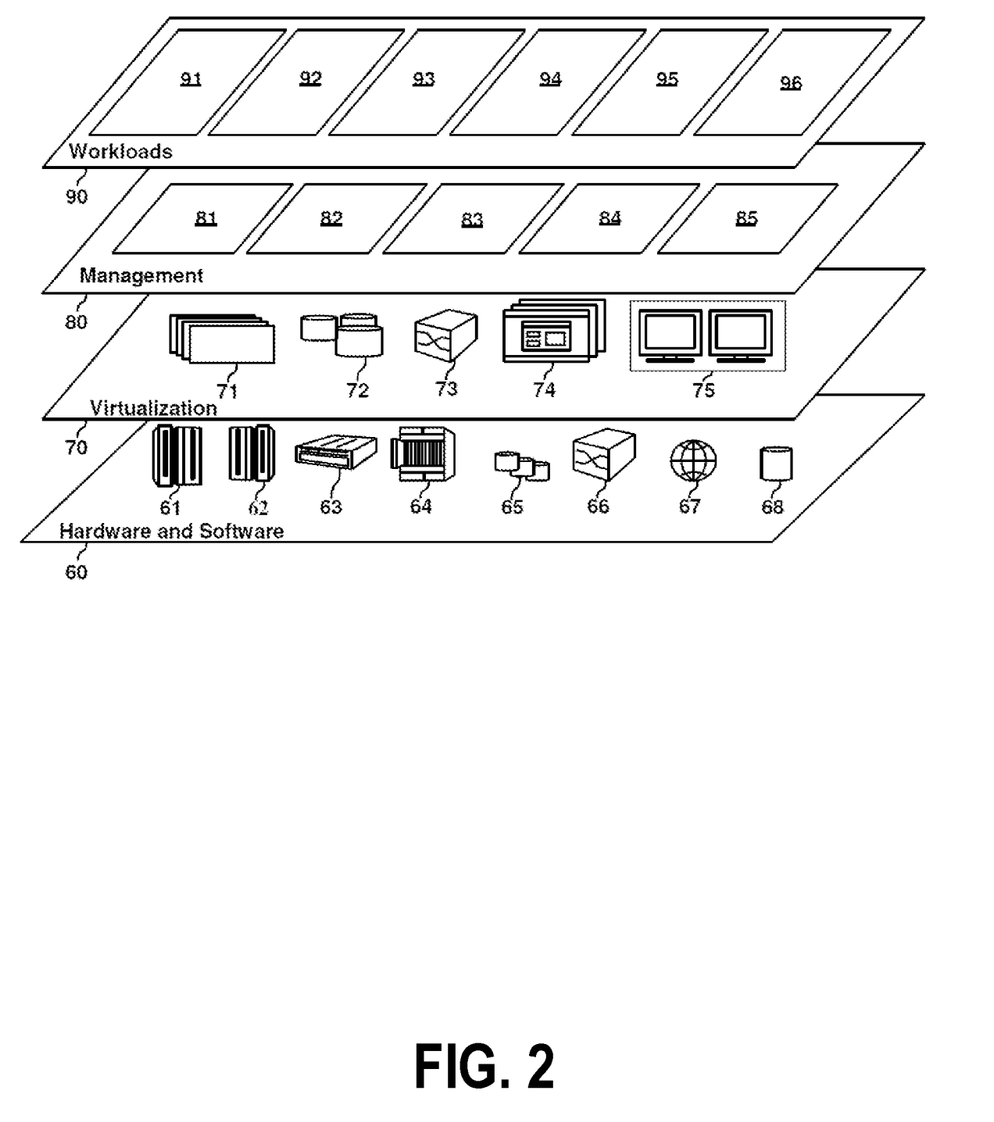
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of a self-learning natural-language generation rules engine with diachronic linguistic analysis.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
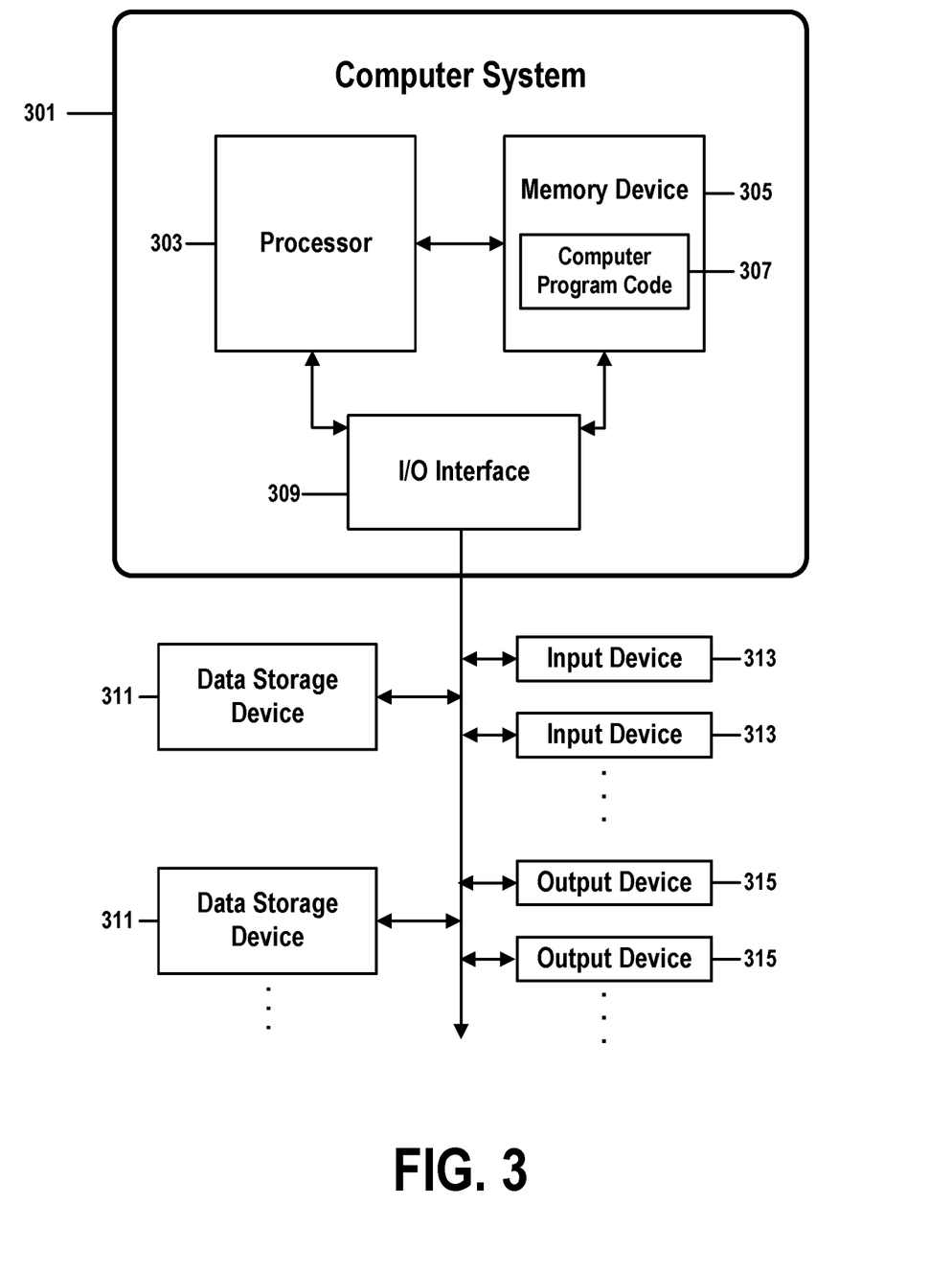
FIG. 3 shows the structure of a computer system and computer program code that may be used to implement a method for a self-learning natural-language generation rules engine with diachronic linguistic analysis in accordance with embodiments of the present invention.

FIG. 3 shows a structure of a computer system and computer program code that may be used to implement a method for a self-learning natural-language generation system in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a self-learning natural-language generation system in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writable, rewritable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a self-learning natural-language generation system.

Any of the components of the present invention could be created, integrated, hosted, maintained, deployed, managed, serviced, supported, etc. by a service provider who offers to facilitate a method for a self-learning natural-language generation system. Thus the present invention discloses a process for deploying or integrating computing infrastructure, comprising integrating computer-readable code into the computer system 301, wherein the code in combination with the computer system 301 is capable of performing a method for a self-learning natural-language generation system.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a self-learning natural-language generation system may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a self-learning natural-language generation system is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
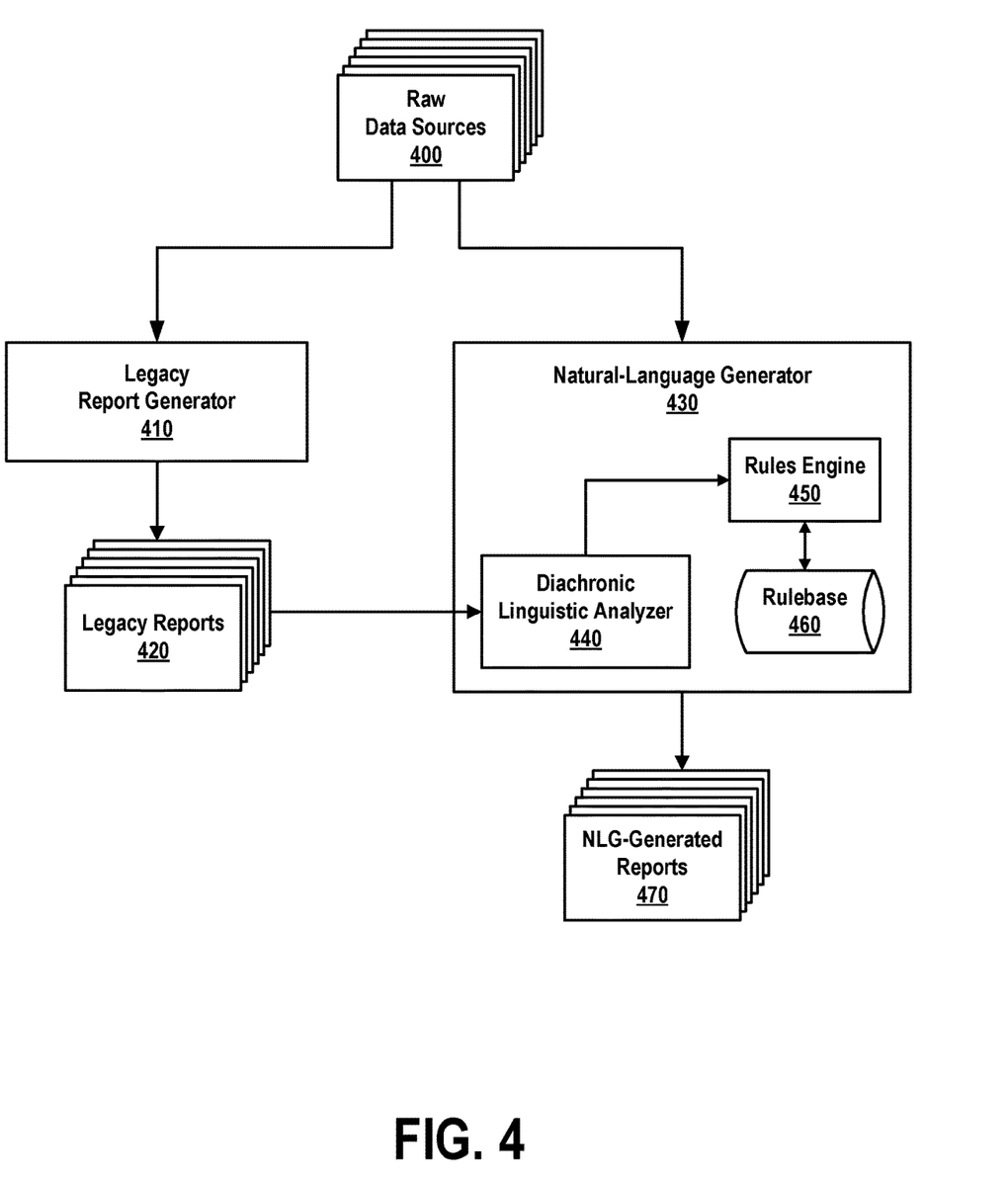
FIG. 4 shows a high-level topology of a self-learning natural-language generation system in accordance with embodiments of the present invention.

FIG. 4 shows a high-level topology of a self-learning natural-language generation system in accordance with embodiments of the present invention. FIG. 4 contains steps 400-470, which may be performed by embodiments implemented on platforms like those shown in FIGS. 1-3.

Natural language generation (NLG) system 430, in accordance with embodiments of the present invention, comprises a rules engine 450 that generates and manages translation rules stored in rulebase 460. These rules direct actions of the central processor of NLG system 430 when translating raw data derived from one or more sources 400 into natural language text. These sources may include Internet-of-Things (IoT) sensors or devices, databases, Web services, Web sites, publicly available references, published statistics, or any other data source known in the art.

Legacy natural-language report generator 410 generates natural-language legacy reports 420 from raw data retrieved from data sources 400. Legacy generator 410 may be an existing type of NLG application, an improved NLG application that conforms to embodiments of the present invention (but is distinct from natural-language generator 430), or a manual procedure performed by humans or by a legacy procedure that does not comprise the novel elements of the present invention.

A diachronic linguistic analyzer (DLA) module 440 of NLG system 430 analyzes each legacy report 420 in order to infer correlations between linguistic features of a report's natural-language text and one or more temporal characteristics of the report or of the raw data from which the report was generated by legacy report generator 410. As described above, these temporal characteristics may comprise, or be associated with, a report's publication date or generation date or a creation date or capture date of data used to generate the report.

DLA analysis attempts to partition the legacy reports into two groups, as a function of the one or more temporal characteristics being considered. For example, the DLA module 440 may divide the legacy reports 420 into a long-term group of reports created more than six months ago and a short-term group of reports that were created within the previous 24 hours.

DLA module 440 uses cognitive analytics or other methods of artificial intelligence to infer natural-language generation rules that correlate a temporal characteristic of a report or of data used to generate the report with a linguistic characteristic of natural language comprised by the report. For example, if DLA module 440 determines that broader, qualitative language is used in traffic forecast reports generated from data captured more than one week prior to an event expected to produce unusual traffic conditions, and that more precise, quantitative language is used in forecasts generated from data captured during the two days prior to the event, then DLA module 440 would generate a set of rules that direct NLG system 430 to:

i) determine the age of raw data received from a data source 400; and ii) based on the age of the raw data, generate natural language that comprises either broader, qualitative language or precise, quantitative language within the context of the report.

DLA module 440 forwards these rules to rules engine 450, which stores the inferred rules in rulebase 460, where the rules will be used by NLG system 430 in the future to translate newly received data into NLG-generated reports 470.

In some embodiments, DLA module 440 forwards only inferences and identified correlations to rules engine 450. In such cases, rules engine 450 generates new rules or updates existing rules and then stores the resulting rules in rulebase 460.

Some embodiments may include machine-learning components and training modules not shown in FIG. 4. These components and modules, using methods of machine learning known in the art, may perform tasks like aggregating legacy reports 420 and the data from which those reports are generated, or aggregating reports previously generated by NLG system 430 into the specific type of training "corpus" used to train self-learning software applications. When used in conjunction with feedback that identifies how accurately each linguistic choice made by the NLG system 430 produced realistic natural language, the training subsystem teaches DLA module 440, rules engine 450, and other modules of NLG system 430 how to more accurately account for temporal considerations when translating raw data into natural language.

Figure 5:
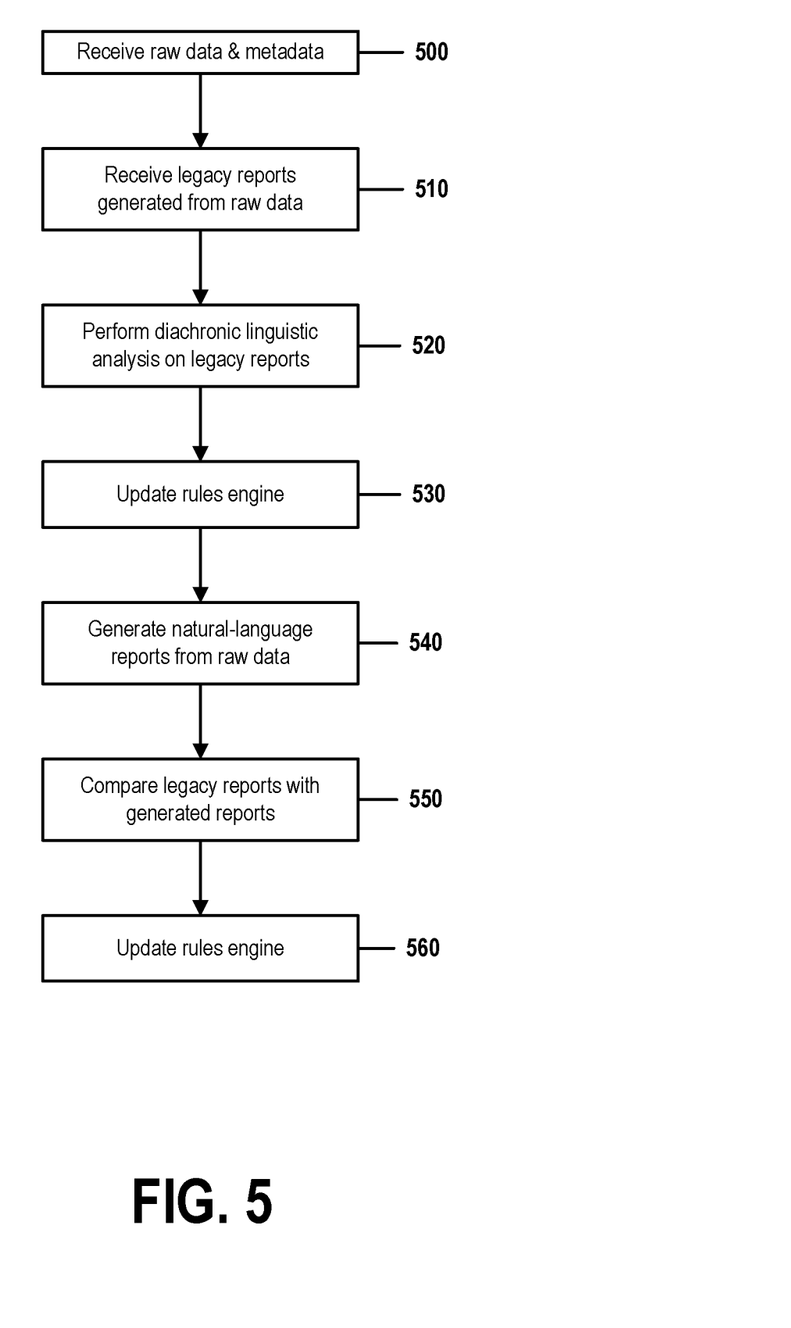
FIG. 5 is a flow chart that illustrates the steps of a method for a self-learning natural-language generation system in accordance with embodiments of the present invention.

FIG. 5 is a flow chart that illustrates the steps of a method for a self-learning natural-language generation system in accordance with embodiments of the present invention. FIG. 5 contains steps 500-560, which may be performed by embodiments implemented on platforms like those shown in FIGS. 1-4.

In step 500, improved natural-language generation (NLG) system 430 receives raw data from one or more sources 400. The raw data may comprise any sort of data known in the art that can be translated into natural-language prose and may be received from combinations of any types of known data source, such as Internet-of-Things (IoT) devices, a database, a Web service or a cloud service, a news service, a financial service, a weather service, a commercial product or service vendor, a Web site, publicly available reference sources, private business records, or published statistics.

The system 430 may also in this step receive metadata or contextual data that provides context or semantic meaning to the raw data. For example, if the raw data comprise wind-velocities, barometric pressures, ocean surface temperature, and other weather-related data items, each of these items might be accompanied by associated data elements that identify the time and location at which each weather-related data item was recorded, a characteristic of a sensor or tracking device that recorded the weather-related data item, or the frequency at which each type of weather-related data item was sampled.

In step 510, system 430 receives a set of legacy natural-language reports 420 that had previously been generated by a legacy report-generation mechanism 410. This mechanism 410 may be any manual or automated mechanism that is known to accurately produce natural-language text.

In step 520, diachronic linguistic analyzer (DLA) module 440 of NLG system 430 performs a diachronic linguistic analysis upon the legacy reports 420. This analysis divides the reports or the raw data from which the reports were generated into two diachronic groups that are differentiated by value ranges of a temporal factor or characteristic. In some embodiments, the two subsets are mutually exclusive or together include every report in the received legacy reports 420. In other words, in such embodiments, every report of the received legacy reports 420 belongs to one and only one of the two groups.

The DLA module 440 may use contextual information, or rulebase rules inferred from past DLA analyses, to determine which temporal characteristic should be used to divide the reports 420. For example, if oil-well legislation passed in 2015 changed the type of language that must be used to report oil-well statistics, DLA module 440 would divide the reports 420 into two groups as a function of the capture date of raw data associated with each report. In this example, a first subset of "long-term" or "far-term" reports would contain reports generated from data captured no later than 2015 and a second subset of "short-term" or "near-term" reports would contain reports generated from data captured since 2016.

In a related example, DLA module 440 might instead divide the reports into two groups as a function of each report's publication data. In this example, a first group of "long-term" or "far-term" reports would contain reports published no later than 2015 and a second group of "short-term" or "near-term" reports would contain reports published since 2016.

Another embodiment could further consider the

In another example, DLA module 440 might select a temporal characteristic based on differences in a duration of time, rather than one based on a threshold date or range of dates. In the previous storm-prediction example, such a characteristic would be a duration of time between the publication of a weather forecast and the time of occurrence of a weather event predicted by the report. As described above, reports that predict an event occurrent several weeks in the future do so in a different linguistic style than the style used by reports that predict an imminent weather event. Here, if a first diachronic group contains reports of weather events occurring at least two days after the publication date of the report, a second diachronic group would contain reports of weather events predicted to occur within two days of the report's publication date.

Alternatively, DLA module 440, depending on contextual and historical data and inferences, might instead deem that a more relevant temporal characteristic is the duration of time between the predicted time of occurrence of the weather event and the time at which the reported data was captured. In this case, the first diachronic group might contain forecasts that report weather data captured at least three days prior to the predicted arrival of the event and the second diachronic group would contain forecasts that report data captured no more than three days prior to the event's predicted arrival.

Temporal characteristics may also be used to divide the received legacy reports 420 into two diachronically exclusive groups. For example, the system 430 might consider the duration of a span of time through which values of a temporal characteristic might range. This factor could be considered both when selecting a temporal characteristic and when selecting a threshold value of the characteristic that is used to partition the reports or raw data into near-term and far-term groups. A group of reports published over a seven-year period, or based on archival data gathered over decades, might well require consideration of different temporal characteristics than does another group that is published over the course of a few days and is based on data sampled at hourly intervals throughout those few days, or sampled just minutes prior to the publication of each report.

But in all cases, a document is assigned to a particular group based on some sort of temporal characteristic of either the raw data from which was generated natural language comprised by the document, or by a temporal characteristic of the document itself.

DLA module 420 may select a temporal characteristic by cognitive means, such as by following a rulebase rule that linguistic characteristics of storm forecasts have in the past been recognized as depending in part upon whether the forecast predicts imminent arrival of a storm. In these cases, the rulebase rule may have been inferred by previous iterations of the method of FIG. 5, by other machine-learning training or feedback mechanisms, by manual entry of such a rule, or by other means known in fields such as artificial intelligence, cognitive computing, natural-language generation, or natural-language processing.

The diachronic linguistic analysis concludes by performing a linguistic analysis upon the two groups of reports and identifying linguistic differences between the two groups. When such a linguistic difference is detected, DLA module 440 infers a correlation between the two groups' linguistic differences and the difference between the two group's values of the temporal characteristic.

For example, the DLA module 440 might determine that the group of "far-term" weather forecasts contains natural language that represents raw data in relatively vague, qualitative terms and an abstract, journalistic tone, and that the group of "near-term" weather forecasts contains natural language that represents raw data in relatively precise, quantitative terms and that has a more personalized cautionary or protective tone. DLA module 440 might infer from this result a rule stating that weather data should be translated into more vague, qualitative language with a journalistic tone when the data predicts a storm that is still in an early stage of formation, and that weather data should be translated into more precise, quantitative language with a cautionary tone when the data predicts that a storm is about to strike.

The diachronic linguistic analysis comprises numerous steps known in the art, which may include operations like that perform a sequence of operations like: determining which elements of the raw input data should be used to generate natural language; ordering and structuring the elements of raw data that have been deemed relevant; aggregating the elements into clusters that correspond to sentences; using a method of lexical analysis to select which terms should be used to represent quantitative values; generating phrases or expressions that describe contextual objects; and using syntactical, morphological, and orthographic analyses to combine all these elements into natural-language text.

The analysis may also identify linguistic elements that correlate to values of a temporal characteristic by identifying "achronal anchors" within the natural language of a legacy report 420. Achronal anchors are linguistic features that do not correlate to temporal characteristics and thus are represented in a consistent way over time. Examples of achronal anchors include proper names, scientific terms, legacy legal and financial terminology, and street addresses.

DLA module 440 may also in step 520 identify correlations between specific types of raw data, corresponding linguistic features, and specific IoT sensors, input devices, or other data sources 400. For example, DLA module 440 may infer that weather reports produced by a particular weather service are based on a certain subset of available IoT sensors that include various types of temperature-sensing and humidity-sensing devices, but do not include air-pressure sensors. This inference may help DLA module 440 understand why weather reports produced by other services contain language related to air pressure that is not found in reports generated by data received from the first service. Other types of correlations and inferences may be derived from inferred associations between certain sensors and certain linguistic characteristics of an associated report.

Additional temporal factors may be considered when generating an inferred rule. For example, an embodiment could, upon determining that a particular temporal characteristic is associated with ongoing, multiple, or continuous variations in linguistic characteristics, assign greater weight to more recent reports or to reports generated from more recent data. The resulting inferred rules would thus be biased toward natural language associated with more recent input, or a predetermined threshold of the temporal characteristic may be shifted such that a greater number of reports or data items are allocated to the near-term group, or that the near-term group is deemed to have greater importance. Such weighting is especially important if a corpus of data or reports is very large, if the relative number of far-term data or reports is disproportionately large in relation to the number of near-term data or reports, or if an extrinsic factor that determines how the groups are partitioned is so recent that a near-term group does not yet include a sufficient number of entries. In such cases, the weighting ensures that more recent linguistic changes are represented by a statistically significant number of reports or data items.

At the conclusion of step 520, DLA module 440 will have inferred a set of rules for selecting particular linguistic characteristics when translating raw data to natural language. These rules are derived from correlations that DLA module 440 has inferred in this step that correlate linguistic characteristics of each group of reports with the temporal-characteristic values or ranges associated with that group.

In step 530, DLA module 440 forwards these rules to rules engine 450, which stores the rules in rulebase 460. Certain embodiments may comprise minor variations of this procedure. For example, in some embodiments DLA module 440 may directly store the inferred rules into rulebase 460, and in other embodiments, rules engine 450 may generate the rules from inferences received from DLA module 440. These rules may represent completely new logical elements that are added to rulebase 460 or may be mere refinements of rules that already exist in the rulebase 460.

Steps 540-560 describe an optional additional training procedure by which a machine-learning mechanism may use the raw data and reports 420 received in steps 500-510 to further train natural-language generator system 430. In other embodiments, NLG system 430 may instead start using the updated rules stored in rulebase 460 to generate natural language from production data. But even in this latter case, steps analogous to steps 540-560 may be used to ensure that the NLG system 430 continues to refine and improve its ability to generate authentic natural-language prose. This continuous refinement feature cab be important in certain embodiments because correlations between linguistic features and temporal characteristics can themselves change over time and can produce varying results when applied in different contexts.

In step 540, natural-language generator system 430 optionally translates the raw data received in step 500 into a set of NLG-generated natural-language reports. This translation is performed by a procedure similar to that of steps 500-520, by using context or metadata to select a temporal characteristic of the raw data, associating the raw data with a value of the temporal characteristic, and then selecting and following rulebase rules that determine how to generate natural language appropriate to the type, context, and temporal characteristics of the raw data.

In step 550, NLG system 430 compares natural language comprised by the NLG-generated reports generated in step 540 with natural language comprised by the legacy reports received in step 510. These comparisons, like earlier inferences, compare language generated by the legacy report-generation mechanism 410 from a particular type of data received from a particular source, within the context of a particular value of a particular temporal characteristic, with language generated in step 540 by NLG system 430 from the same type of data received from the same source within the context of the same value of the same temporal characteristic. System 430 may use metadata or contextual information, such as data time stamps, to facilitate these comparisons.

In some cases, other components or a human administrator or user may provide feedback that can be used to further train the system 430. For example, if the NLG-generated reports 470 contain repeated instances of a particular linguistic feature that does not appear in equivalent legacy reports 420, an administrator may provide feedback informing system 430 that this discrepancy can be ignored. In a related example, another artificially intelligent module may, by means of known methods of cognitive analytics, provide feedback informing system 430 that the discrepancy is due to a repeated misinterpretation of data elements received from a particular class of IoT sensor.

In step 560, as in steps 520 and 530, system 430, as a function of results of the comparison of step 550, infers new rulebase rules and updates existing rulebase rules. The system 430 selects these new and updated rules so as to minimize the difference between the legacy reports 420, which comprise known good natural language, and the NLG-generated reports 470 generated in step 540. The goal of this step is to update rulebase 460 to most accurately generate the same natural language output that would be generated through manual means from the same data and data source, given the same context and temporal characteristics.

Variations of the method of FIG. 5 may continue indefinitely, or as desired by an implementer, in order to continue to train system 430 to more accurately translate raw data into natural language that takes into consideration temporal characteristics of the raw data or of the natural language that is generated from the raw data. Throughout these procedures, DLA module 440 and rules engine 450 will continue to automatically update rulebase 460 in order to ensure that system 430 produces the most accurate translations.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A natural-language generation (NLG) system comprising a processor, a memory coupled to the processor, and a computer-readable hardware storage device coupled to the processor, the storage device containing program code configured to be run by the processor via the memory to implement a method for self-learning natural-language generation, the method comprising:

the processor retrieving raw data from one or more extrinsic sources;

the processor partitioning the raw data into short-term data that is more recent than a predetermined threshold date and long-term data that is at least as old as the threshold date;

the processor receiving a set of short-term legacy reports that comprise natural-language translations of subsets of the short-term data and a set of long-term legacy reports that comprise natural-language translations of subsets of the long-term data;

the processor generating a set of NLG-generated reports by using the inferred rules to translate the raw data into natural language;

the processor comparing the NLG-generated reports to the short-term legacy reports and to the long-term legacy reports;

the processor updating the translation rules such that the updated translation rules translate the received raw data into natural language that more closely matches natural language comprised by the short-term legacy reports and by the long-term legacy reports;

the processor performing a diachronic linguistic analysis that identifies linguistic differences between the short-term legacy reports and the long-term legacy reports;

the processor inferring, as a function of the linguistic differences, one or more translation rules by which a rules engine of the NLG system generates natural-language text; and the processor storing the one or more translation rules in a rulebase of the NLG system.

2. The system of claim 1, where the diachronic linguistic analysis comprises:
the processor identifying a short-term linguistic characteristic that is characteristic of natural language generated from short-term data but is not characteristic of natural language generated from long-term data;
the processor identifying a long-term linguistic characteristic that is characteristic of natural language generated from long-term data but is not characteristic of natural language generated from short-term data; and
the processor identifying an achronal linguistic characteristic that is both characteristic of natural language generated from short-term data and characteristic of natural language generated from long-term data.

3. The system of claim 1, where the one or more extrinsic sources comprise Internet-of-Things (IoT) devices.

4. The system of claim 1,
where the one or more translation rules comprise a first rule for translating short-term data into natural language and a second rule for translating long-term data into natural language, and
where the first rule specifies an action that is distinct from any action specified by the second rule.

5. The system of claim 1, where at least one of the inferred translation rules specifies that the rules engine should determine whether a block of input data is short-term data or long-term data before determining how to translate the block of input data into natural language.

6. A method comprising:
a processor of a self-learning natural-language generation system retrieving raw data from one or more extrinsic sources, where the system comprises the processor, a memory coupled to the processor, and a computer-readable hardware storage device coupled to the processor, the storage device containing program code configured to be run by the processor via the memory to implement the method;
the processor partitioning the raw data into short-term data that is more recent than a predetermined threshold date and long-term data that is at least as old as the threshold date;
the processor receiving a set of short-term legacy reports that comprise natural-language translations of subsets of the short-term data and a set of long-term legacy reports that comprise natural-language translations of subsets of the long-term data;
the processor generating a set of NLG-generated reports by using the inferred rules to translate the raw data into natural language;
the processor comparing the NLG-generated reports to the short-term legacy reports and to the long-term legacy reports;
the processor updating the translation rules such that the updated translation rules translate the received raw data into natural language that more closely matches natural language comprised by the short-term legacy reports and by the long-term legacy reports;
the processor performing a diachronic linguistic analysis that identifies linguistic differences between the short-term legacy reports and the long-term legacy reports;
the processor inferring, as a function of the linguistic differences, one or more translation rules by which a rules engine of the NLG system generates natural-language text; and the processor storing the one or more translation rules in a rulebase of the NLG system.

7. The method of claim 6, where the diachronic linguistic analysis comprises:
the processor identifying a short-term linguistic characteristic that is characteristic of natural language generated from short-term data but is not characteristic of natural language generated from long-term data;
the processor identifying a long-term linguistic characteristic that is characteristic of natural language generated from long-term data but is not characteristic of natural language generated from short-term data; and
the processor identifying an achronal linguistic characteristic that is both characteristic of natural language generated from short-term data and characteristic of natural language generated from long-term data.

8. The method of claim 6, where the one or more extrinsic sources comprise Internet-of-Things (IoT) devices.

9. The method of claim 6,
where the one or more translation rules comprise a first rule for translating short-term data into natural language and a second rule for translating long-term data into natural language, and
where the first rule specifies an action that is distinct from any action specified by the second rule.

10. The method of claim 6, where at least one of the inferred translation rules specifies that the rules engine should determine whether a block of input data is short-term data or long-term data before determining how to translate the block of input data into natural language.

11. The method of claim 6, further comprising providing at least one support service for at least one of creating, integrating, hosting, maintaining, and deploying computer-readable program code in the computer system, wherein the computer-readable program code in combination with the computer system is configured to implement the retrieving, the partitioning, the receiving, the generating, the comparing, the updating, the performing, the inferring, and the storing.

12. A computer program product, comprising a computer-readable hardware storage device having a computer-readable program code stored therein, the program code configured to be executed by a natural-language generation system comprising a processor, a memory coupled to the processor, and a computer-readable hardware storage device coupled to the processor, the storage device containing program code configured to be run by the processor via the memory to implement a method for self-learning natural-language generation, method comprising:
the processor retrieving raw data from one or more extrinsic sources;
the processor partitioning the raw data into short-term data that is more recent than a predetermined threshold date and long-term data that is at least as old as the threshold date;
the processor receiving a set of short-term legacy reports that comprise natural-language translations of subsets of the short-term data and a set of long-term legacy reports that comprise natural-language translations of subsets of the long-term data;
the processor generating a set of NLG-generated reports by using the inferred rules to translate the raw data into natural language;
the processor comparing the NLG-generated reports to the short-term legacy reports and to the long-term legacy reports;

the processor updating the translation rules such that the updated translation rules translate the received raw data into natural language that more closely matches natural language comprised by the short-term legacy reports and by the long-term legacy reports;

the processor performing a diachronic linguistic analysis that identifies linguistic differences between the short-term legacy reports and the long-term legacy reports;

the processor inferring, as a function of the linguistic differences, one or more translation rules by which a rules engine of the NLG system generates natural-language text; and the processor storing the one or more translation rules in a rulebase of the NLG system.

13. The computer program product of claim 12, where the diachronic linguistic analysis comprises:

the processor identifying a short-term linguistic characteristic that is characteristic of natural language generated from short-term data but is not characteristic of natural language generated from long-term data;

the processor identifying a long-term linguistic characteristic that is characteristic of natural language generated from long-term data but is not characteristic of natural language generated from short-term data; and the processor identifying an achronal linguistic characteristic that is both characteristic of natural language generated from short-term data and characteristic of natural language generated from long-term data.

14. The computer program product of claim 12, where the one or more extrinsic sources comprise Internet-of-Things (IoT) devices.

15. The computer program product of claim 12, where the one or more translation rules comprise a first rule for translating short-term data into natural language and a second rule for translating long-term data into natural language, and where the first rule specifies an action that is distinct from any action specified by the second rule.

16. The computer program product of claim 12, where at least one of the inferred translation rules specifies that the rules engine should determine whether a block of input data is short-term data or long-term data before determining how to translate the block of input data into natural language.

* * * * *